United States Patent [19]

Ishijima et al.

[11] 4,172,223

[45] Oct. 23, 1979

[54] X-RAY GENERATOR

[75] Inventors: Hiroshi Ishijima; Jiro Kaneko, both of Tokyo, Japan

[73] Assignee: Kabushiki Kaisha Daini Seikosha, Japan

[21] Appl. No.: 806,549

[22] Filed: Jun. 14, 1977

[30] Foreign Application Priority Data

Jun. 23, 1976 [JP] Japan .................................. 51-74161

[51] Int. Cl.[2] .............................................. G01N 23/22

[52] U.S. Cl. ..................................... 250/272; 250/409

[58] Field of Search ................... 250/409, 445 T, 272, 250/460

[56] References Cited

U.S. PATENT DOCUMENTS

| | | | |
|---|---|---|---|
| 3,567,854 | 3/1971 | Tschantz et al. | 250/409 |
| 3,783,286 | 1/1974 | Kremer | 250/409 |
| 4,051,377 | 9/1977 | Kemner et al. | 250/445 T |

*Primary Examiner*—Alfred E. Smith
*Assistant Examiner*—T. N. Grigsby
*Attorney, Agent, or Firm*—Robert E. Burns; Emmanuel J. Lobato; Bruce L. Adams

[57] ABSTRACT

An X-ray generator has an X-ray tube for generating X rays which are detected by an X-ray detector for feedback control of the X-ray tube. The filament current of the X-ray tube is controlled in accordance with the deviation of the X-ray intensity for compensating for any deviation which occurs due to the X-ray tube deterioration or fluctuation of the air density of the X-ray path.

5 Claims, 3 Drawing Figures

X-RAY GENERATOR

BACKGROUND OF THE INVENTION

This invention relates to an X-ray generator having an automatic gain controlled circuit for stabilizing the X-ray intensity.

Conventionally, a stabilizing circuit for an X-ray generator as shown in FIG. 1 is generally used, in which a high voltage output of a constant voltage source 4 is applied between the anode 2 and the filament (or cathode) 3 of an X-ray tube 1 while the filament current is supplied from an adjustable current source 5. In such a system, by setting the anode-cathode voltage (X-ray tube voltage) to V and the anode current (X-ray tube current) to i, the value of i is dependent on the filament current $I_f$ and the voltage V. The X-ray intensity I is shown as follows, setting the minimum excited potential to $V_0$ and wherein $K_1$ and $K_2$ are constants:

$$I(V)=K_1(V-V_0)^{3/2} \quad (1)$$

$$I(i)=K_2 \cdot i \quad (2)$$

If V and If are kept constant, the X-ray intensity I is stabilized for a while, but the anode current i will drift on account of the temperature rise of the X-ray tube. And accordingly, the intensity I will change in accordance with the equation (2). For compensating this change, a current detector 6 is provided to determine the anode current i which current signal is fed to the current source 5 through a feedback circuit 7 to control the filament current If so that the anode current is kept constant. Nevertheless, this conventional feedback device cannot compensate for X-ray intensity changes occurring over a long time period due to the X-ray tube deterioration (particularly due to contamination). Further, it cannot solve problems of fluctuation of X-ray intensity actually received by an X-ray detector 1*a*, since the X-ray intensity reaching the detector 1*a* is made somewhat feeble on account of X-ray absorption by air and the absorption rate changes in response to changes in air density which are dependent on atmospheric pressure and temperature.

BRIEF SUMMARY OF THE INVENTION

Therefore, it is an object of the present invention to provide an X-ray generator having an automatic gain controlled circuit for stabilizing the X-ray intensity, and which can compensate X-ray both for intensity for the deterioration of the X-ray tube occurring over a long time and for atmospheric pressure and temperature changes occurring over a short time.

It is another object of the invention to provide an X-ray generator having an automatic gain controlled circuit for stabilizing the X-ray intensity, and with which the X-ray spectrum or energy level is always fixed irrespective of the gain control so that there is no adverse effect on the excitation coefficiency for analyzing process.

It is still another object of the invention to provide an X-ray generator having an automatic gain controlled circuit for stabilizing the X-ray intensity, and which does not require a highly accurate constant voltage source for achieving X-ray intensity stabilization.

DETAILED DESCRIPTION OF THE PREFERRED EMBODIMENT

A fundamental embodiment of this invention will be described referring to FIG. 2 while an application of the invention to an X-ray fluorescent analyser will be described referring to FIG. 3.

Figure 1:
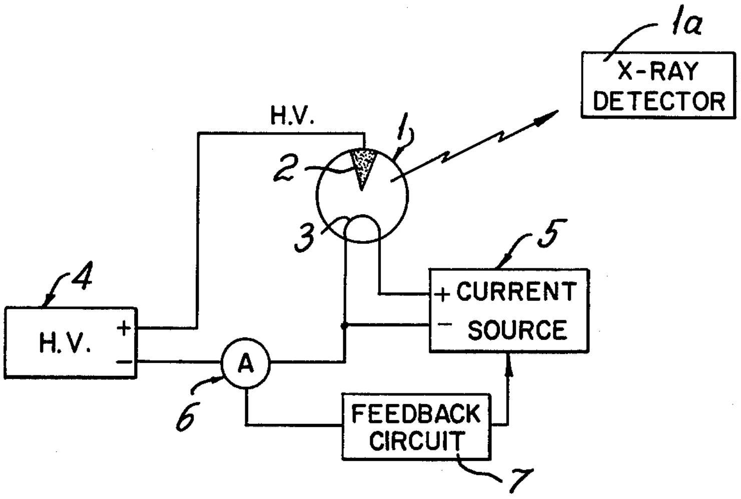
FIG. 1 PRIOR ART
FIG. 1 is a block diagram showing a conventional X-ray generator for an X-ray fluorescent analyser.
Figure 2:
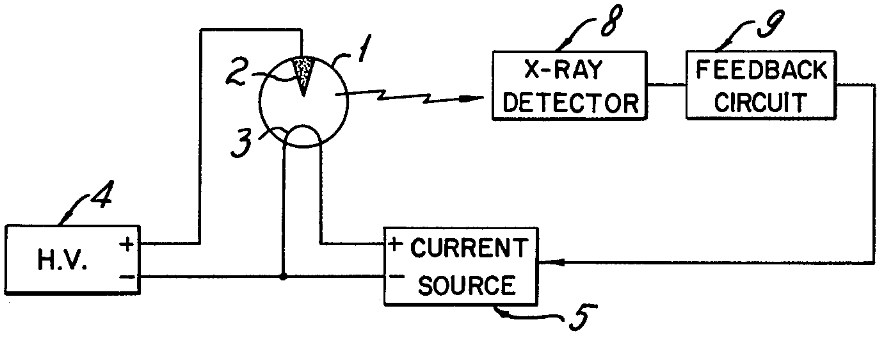
FIG. 2 is a block diagram showing an X-ray generator of this invention.
Figure 3:
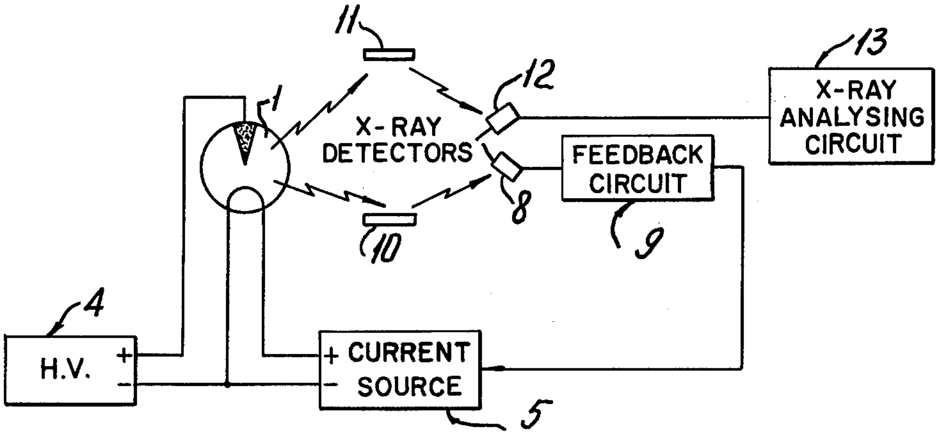
FIG. 3 is a block diagram showing an X-ray fluorescent analyser using this invention.

In FIGS. 2 and 3, an X-ray generator having an automatic gain controlled circuit according to this invention comprises an X-ray tube 1, a constant voltage source 4 applying a high voltage between the anode 2 and the filament 3 of the X-ray tube 1, a current source 5 which supplys the filament current to the filament 3, an X-ray detector 8 to detect X-rays irradiated from the X-ray tube 1 for feedback control, and a feedback circuit 9 to receive the output signal of the X-ray detector 8 for controlling the current source 5.

X-ray tube 1 irradiates X-rays which vary in intensity according to the filament current as well as the high voltage between the anode and the filament.

X-ray detector 8 is a proportional counter in this embodiment but may be replaceable with other counters or radiant ray detectors such as a scintillation counter or ionization chamber.

In the case of a pulse-output type counter, such as a proportional counter, the feedback circuit 9 would include a rate-meter or digital-to-analogue (D-A) converting circuit to convert the output pulse signals of the X-ray detector 8 to D.C. potential signals as the output signal of feedback circuit 9. Further, a pulse height discriminator or discriminators before the D-A converting circuit may be included the in feedback circuit 9 for discriminating the output pulses having the desired pulse height. The pulse height discriminator serves to more suitably control the constant current source 5, because the absorption coefficiency of the atmosphere is dependent on the X-ray energy to be absorbed and so just the X-ray spectrum to be used for the analysing is preferably selected among all the X-rays irradiated from the X-ray tube or others for the feedback control.

In FIG. 3, reference numerals 1, 4, 5, 8 and 9 respectively designate the same parts as those in FIG. 2. X-rays irradiated from the X-ray tube 1 are applied both to a sample material 11 to be analysed and to a reference material 10. Sample material 11 and reference material 10 are preferably arranged, for instance, symmetrical with respect to the axis of the X-ray tube 1 to receive X-rays of equal intensity through equal pathes. Reference material 10 implies the same element as that to be analysed in sample material 11.

The elements in sample 11 and reference 10 are thus excited and generate fluorescent X-rays having a proportional intensity to that of the X-rays generated from the X-ray tube 1.

Fluorescent X-rays from the sample material 11 and detected by an X-ray detector 12 while fluorescent X-rays from the reference material 10 are detected by the X-ray detector 8. The output of the X-ray detector 12 is fed to an X-ray analysing circuit 13 which includes, as well known, a pulse height discriminator and a D-A converter for analysing X-rays.

In operation of the above-mentioned X-ray fluorescent analyser in FIG. 3, X-rays from the X-ray tube 1 excite the element in sample material 11 to generate fluorescent X-rays whose wave length corresponds to and characterizes the element and whose intensity or generation frequency is dependent on the element density and the exciting X-ray intensity. The exiting X-ray intensity is always controlled to be constant as will be described later, and so the output of the X-ray analysing circuit 13 accurately corresponds to the element density. Thus, quantative analysis of the element in the sample material is obtained.

X-rays from the X-ray tube 1 also excite the element in reference 10 which is placed at an equal distance from the X-ray tube 1 as the sample 11. As sample 11 and reference 10 are placed at equal distances from the X-ray tube 1 and disposed symmetrically with respect to the X-ray tube axis, the same absorption rate exists in both X-rays received by sample 11 and reference 10 so that sample 11 and reference 10 receive X-rays of the same intensity. As aforementioned, the reference material 10 contains the same element as that in sample 11 to be analysed, and accordingly, reference 10 also generates the same fluorescent X-rays corresponding to the element. The distance between sample 11 and X-ray detector 12 is equal to that between reference 10 and X-ray detector 8. The equal distance passages of the same spectrum X-rays from the X-ray tube 1 to both sample 11 and reference 10, and the equal distance passages of the same spectrum X-rays from the sample 11 to the X-ray detector 12 and from the reference 10 to the X-ray detector 8, ensure equal X-ray absorption. Therefore, radiation deterioration of the X-ray tube 1 or fluctuation of the air density in the passages causes equal drift of the X-ray intensity at X-ray detectors 8 and 12.

Current source 5 is controlled by the feedback circuit 9 in a manner that the output voltage of the current source 5 is changed in response to the intensity drift of the X-rays reaching the X-ray detector 8 so that X-ray radiation of the X-ray tube 1 compensates for any X-ray intensity deviation due to the X-ray tube deterioration or fluctuation of air density, while the constant voltage source 4 applies a constant high voltage to the anode.

What is claimed is:

1. An X-ray generator comprising: an X-ray tube for generating X-rays and having an anode and a filament; means for applying voltage to said X-ray tube between said anode and filament; means for controllably supplying filament current to said filament to control the X-ray radiation from said X-ray tube; means including an X-ray detector spaced from said X-ray tube for detecting X-rays irradiated directly or indirectly from said X-ray tube and providing an output signal proportional to the detected X-ray intensity; a feedback circuit connected to said X-ray detector for converting the output signal to a feedback signal and applying the feedback signal to said means for controllably supplying filament current to accordingly control the filament current; and a reference material disposed so as to be excited by X-rays emitted from said X-ray tube to cause said reference material to emit fluorescent X-rays which are detected by said X-ray detector so that X-ray intensity deviations which occur due to deterioration of said X-ray tube and fluctuation of the air density in the X-ray path are compensated for by controlling the filament current to thereby control the X-ray radiation from said X-ray tube.

2. An X-ray generator as claimed in claim 1, wherein said reference material is arranged at a distance from siad X-ray tube approximately equal to that of a sample material which is to be analysed so that both the reference and sample materials receive X-rays of the same intensity, and the distance between said reference material and said X-ray detector is approximately equal to that between said sample material and a second X-ray detector which detects fluorescent X-rays from the sample material for analysing.

3. An X-ray generator for irradiating with X-rays a sample material to be analyzed by X-ray fluorescent analysis comprising: an X-ray tube for generating X-rays and having an anode and a filament; means for applying voltage to said X-ray tube between said anode and filament; means including an adjustable current source for supplying filament current to said filament to control the X-ray radiation from said X-ray tube; a reference material containing the same element as that included in the sample material and being disposed in the path of X-rays emitted by said X-ray tube so as to be irradiated thereby to cause said reference material to emit fluorescent X-rays; a first X-ray detector disposed along the path of the fluorescent X-rays for detecting the fluorescent X-rays and providing an output signal proportional to the detected fluorescent X-ray intensity; a feedback circuit connected to said first X-ray detector for converting the output signal to a feedback signal and applying the feedback signal to said adjustable current source to accordingly control the filament current and thereby control the X-ray radiation from said X-ray tube thereby compensating for X-ray deviations which occur due to deterioration of said X-ray tube and fluctuation of the air density in the X-ray path; and a second X-ray detector disposed along the path of the fluorescent X-rays emitted by the sample for detecting the fluorescent X-rays emitted by the sample and providing a corresponding output signal for use in analyzing the sample material.

4. An X-ray generator according to claim 3; wherein said reference material is disposed at a distance from said X-ray tube approximately equal to that of the sample material so that both the reference and sample materials are irradiated by X-rays of the same intensity.

5. An X-ray generator according to claim 4; wherein the distance between said reference material and said first X-ray detector is approximately equal to the distance between the sample material and said second X-ray detector.

* * * * *